United States Patent
Lee et al.

(10) Patent No.: US 9,607,557 B2
(45) Date of Patent: *Mar. 28, 2017

(54) ELECTROWETTING DISPLAY APPARATUS AND METHOD OF MANUFACTURING THE SAME

(71) Applicant: Amazon Technologies, Inc., Reno, NV (US)

(72) Inventors: Sanghyun Lee, Busan-Si (KR); Yungkyung Park, Seoul (KR); Dohyoung Kwon, Chungcheongnam-do (KR); Gichang Park, Gyeonggi-do (KR); Jongseo Lee, Gyeonggi-do (KR); Andrea Giraldo, Hertogenbosch (NL); Nicolas Bergeron, Stein (NL)

(73) Assignee: Amazon Technologies, Inc., Seattle, WA (US)

(*) Notice: Subject to any disclaimer, the term of this patent is extended or adjusted under 35 U.S.C. 154(b) by 78 days.

This patent is subject to a terminal disclaimer.

(21) Appl. No.: 14/462,288

(22) Filed: Aug. 18, 2014

(65) Prior Publication Data
US 2014/0355102 A1   Dec. 4, 2014

Related U.S. Application Data

(63) Continuation of application No. 13/559,479, filed on Jul. 26, 2012, now Pat. No. 8,810,883.

(30) Foreign Application Priority Data

Dec. 19, 2011  (KR) .................. 10-2011-0137364

(51) Int. Cl.
G02B 26/02 (2006.01)
G09G 3/34 (2006.01)
(Continued)

(52) U.S. Cl.
CPC .............. G09G 3/348 (2013.01); G02B 5/201 (2013.01); G02B 26/005 (2013.01); G02B 27/0018 (2013.01); Y10T 29/49117 (2015.01)

(58) Field of Classification Search
CPC .... G09G 3/344; G09G 2300/08; G09G 3/348; G02B 26/005; G02B 26/02;
(Continued)

(56) References Cited

U.S. PATENT DOCUMENTS 6,967,763 B2  11/2005  Fujii et al.
7,872,790 B2   1/2011  Steckl et al.
(Continued)

FOREIGN PATENT DOCUMENTS

KR   1020060057357 A   5/2006

*Primary Examiner* — James Phan
(74) *Attorney, Agent, or Firm* — Lee & Hayes, PLLC

(57) ABSTRACT

An electrowetting display apparatus includes a first substrate including a first electrode that receives a gray-scale voltage and a second electrode insulated from the first electrode and receiving a reference voltage, a second substrate, a fluid layer, and a color filter. The color filter has a first thickness in an area corresponding to the first electrode and a second thickness in an area corresponding to the second electrode, and the first thickness is larger than the second thickness. Accordingly, a cell gap of the electrowetting display apparatus is reduced, and color reproducibility of the electrowetting display apparatus is improved without sacrificing brightness.

21 Claims, 9 Drawing Sheets

(51) Int. Cl.
*G02B 26/00* (2006.01)
*G02B 5/20* (2006.01)
*G02B 27/00* (2006.01)

(58) Field of Classification Search
CPC .... G02B 26/004; G02B 26/007; G02B 5/201; G02B 27/0018; Y10T 29/49117
USPC ...... 359/227–228, 296, 290; 345/48, 84, 89, 345/107, 690
See application file for complete search history.

(56) References Cited

U.S. PATENT DOCUMENTS 8,810,883 B2 * 8/2014 Lee ........................ G02B 5/201
 345/48
2010/0302615 A1 12/2010 Aubert et al.

* cited by examiner

ELECTROWETTING DISPLAY APPARATUS AND METHOD OF MANUFACTURING THE SAME

CROSS-REFERENCE TO RELATED APPLICATION

The present disclosure is a continuation of and claims priority to U.S. patent application Ser. No. 13/559,479, filed Jul. 26, 2012, now U.S. Pat. No. 8,810,883, issued Aug. 19, 2014, which claims priority to Korean Patent Application No. 10-2011-0137364, filed Dec. 19, 2011, the content of which are herein incorporated by reference in their entirety.

BACKGROUND

1. Field of Disclosure

The present invention relates to an electrowetting display apparatus and a method of manufacturing the same. More particularly, the present invention relates to an electrowetting display apparatus capable of improving color reproducibility without sacrificing brightness and a method of manufacturing the electrowetting display apparatus.

2. Description of the Related Art

An electrowetting display apparatus displays images using an electrowetting phenomenon that causes the movement or deformation of fluid by applying a voltage to the fluid in order to change the surface tension of the fluid.

An electrowetting display apparatus has various properties, such as high transmittance and reflectance, low power consumption, fast response speed, etc.

An electrowetting display apparatus typically includes a first substrate, a second substrate facing the first substrate, and a black ink layer disposed between the first substrate and the second substrate. The electrowetting display apparatus includes a color filter layer disposed between the second substrate and the black ink layer to represent colors.

SUMMARY

In one aspect, the present invention provides an electrowetting display apparatus capable of reducing crosstalk phenomenon and improving color reproducibility without sacrificing brightness.

The present invention, in another aspect, provides a method of manufacturing the electrowetting display apparatus.

In another aspect, an electrowetting display apparatus includes a first substrate, a second substrate facing the first substrate, a fluid layer disposed between the first substrate and the second substrate, and a color filter disposed on a surface of the second substrate to be adjacent to the fluid layer.

The first substrate includes at least one pixel area, and the first substrate includes a first electrode disposed in the pixel area and receiving a gray-scale voltage and a second electrode insulated from the first electrode and receiving a reference voltage. The first substrate may further include a barrier wall positioned at an edge of the pixel area. The second electrode is disposed at a first side of the pixel area.

The fluid layer includes a black fluid layer and a transparent fluid layer and moves due to a voltage difference between the gray-scale voltage and the reference voltage.

The color filter has a first thickness in an area corresponding to the first electrode and a second thickness in an area corresponding to the second electrode, and the first thickness is larger than the second thickness.

In yet another aspect, the invention includes a method of manufacturing an electrowetting display apparatus. A first substrate is formed. The first substrate includes at least one pixel area, and the first substrate includes a first electrode disposed in the pixel area and receiving a gray-scale voltage and a second electrode insulated from the first electrode and receiving a reference voltage. Then, a second substrate is prepared to face the first substrate, and a color filter is formed on the second substrate. The color filter has a thickness that increases with distance from a first side of the pixel area and approaches a second side of the pixel area that is opposite the first side. A black fluid layer and a transparent fluid layer fill a space between the first substrate and the second substrate, and the first substrate is coupled with the second substrate.

The forming of the color filter may include coating a color filter layer on a rear surface of the second substrate, providing a half-tone mask including a plurality of slits formed therethrough on an upper surface of the second substrate, exposing a portion of the color filter layer to a light through the half-tone mask, and etching the exposed portion of the color filter layer.

According to the above, the thickness of the color filter may increase with distance from the first side of the pixel area and approaching the second side of the pixel area, and the black fluid layer may have a height greater than a shortest distance between the color filter and an upper surface of the first substrate, reducing a cell gap of the electrowetting display apparatus.

In addition, when the cell gap is reduced, the light incident from outside of the first substrate is prevented from leaking due to an incident angle and a reflective angle. As a result, crosstalk is reduced.

In addition, the amount of the light reflected by the reflective layer is increased by cell-gap reduction, and thus the brightness is improved in each gray-scale level. Further, the thickness of the color filter through which the light passes is increased, so that the color reproducibility of the color filter is improved.

In addition, the amount of the material required to form the color filter of the electrowetting display apparatus is less, thereby reducing the manufacturing cost for the electrowetting display apparatus.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Figure 1:
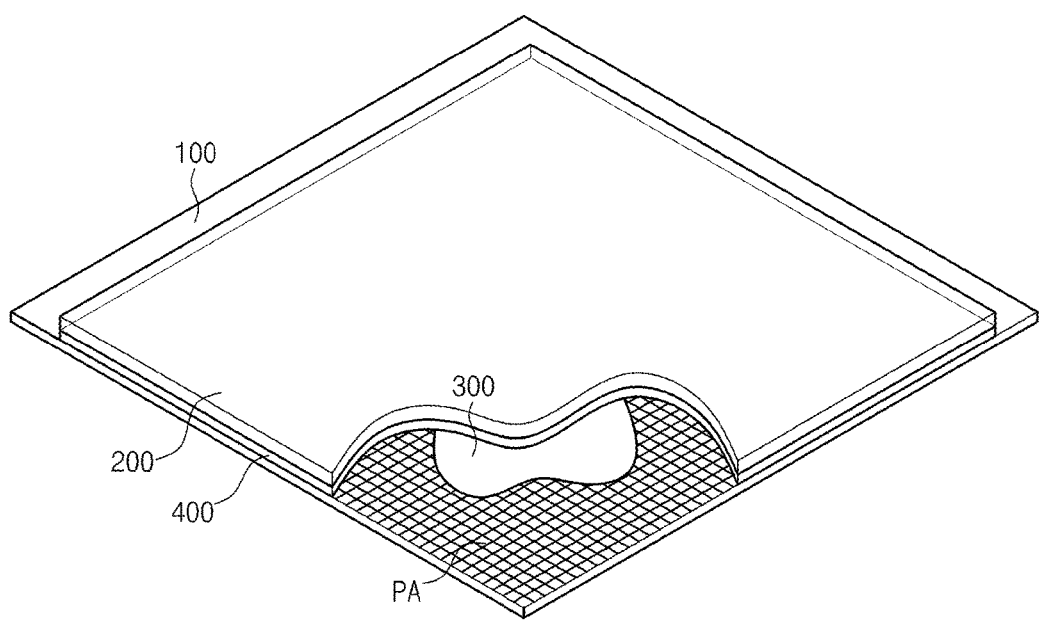
FIG. 1 is a perspective view showing an electrowetting display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a perspective view showing an electrowetting display apparatus according to an exemplary embodiment of the present invention.

Referring to FIG. 1, an electrowetting display apparatus includes a first substrate 100 including a plurality of pixel areas PA, a second substrate 200 facing the first substrate 100, a fluid layer 300 interposed between the first substrate 100 and the second substrate 200, and a color filter disposed on a surface of the second substrate 200, which is adjacent to the fluid layer 300. The fluid layer 300 includes a polar fluid layer and a non-polar fluid layer.

Figure 2:
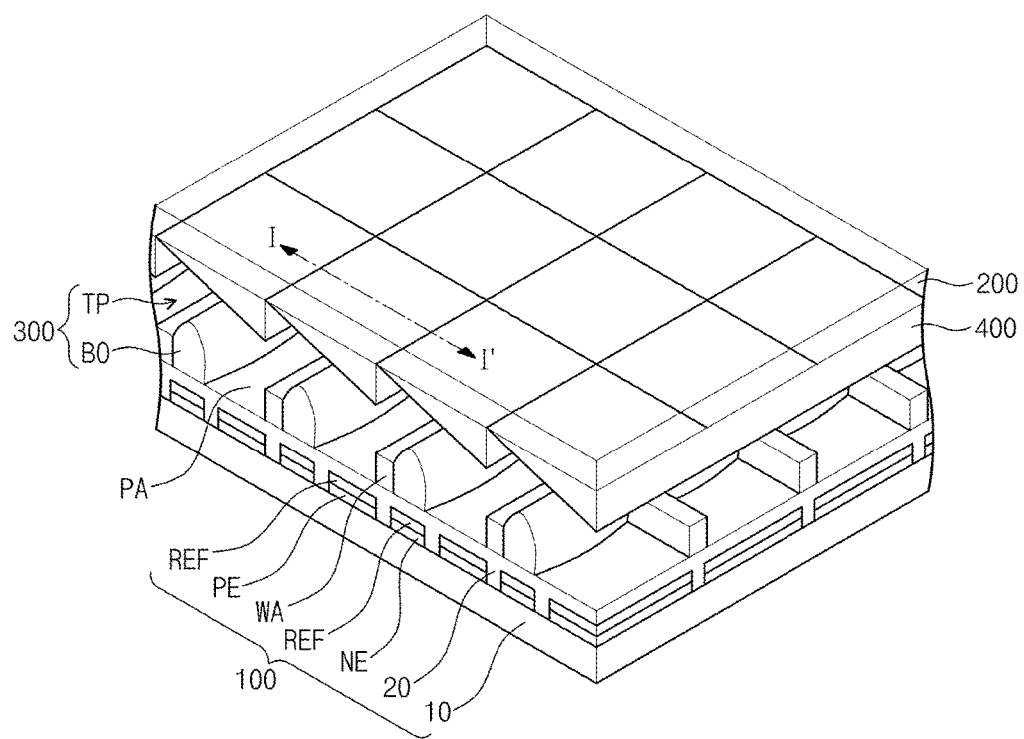
FIG. 2 is a partially enlarged view showing a portion of the electrowetting display apparatus shown in FIG. 1.

FIG. 2 is a partially enlarged view showing a portion of the electrowetting display apparatus shown in FIG. 1.

The pixel areas PA are defined on the first substrate 100 and arranged in a matrix form. In FIG. 2, the pixel areas PA are arranged in four rows and three columns. In the present exemplary embodiment, the pixel areas PA have the same structure and function, and thus one pixel area PA will be described in detail as a representative example.

The first substrate 100 includes an insulating substrate 10, a first electrode PE, a second electrode NE, a reflective layer REF, an insulating layer 20, and a barrier wall WA.

Although not shown in figures, the insulating substrate may further include a gate line, a data line, and a switching device thereon. The gate line is insulated from the data line while crossing the data line. The switching device may be a thin film transistor, and the thin film transistor includes a gate electrode, a semiconductor layer, a source electrode, and a drain electrode.

The first electrode PE is disposed on the insulating substrate 10 to correspond to at least a portion of the pixel area PA. The first electrode PE is connected to the drain electrode and receives a gray-scale voltage from the data line.

The second electrode NE is disposed on the insulating substrate 10 and spaced apart from the first electrode PE so as to be electrically insulated from the insulating substrate 10. The second electrode NE is disposed adjacent to a first side of the pixel electrode PE. The second electrode NE receives a reference voltage. The reference voltage has a constant voltage level different from that of the gray-scale voltage.

The reflective layer REF is disposed on the first electrode PE and the second electrode NE. The reflective layer REF reflects light traveling to the first substrate 100 from outside of the first substrate 100 and passing through the pixel area PA.

The insulating layer 20 covers the insulating substrate 10, the first electrode PE, the second electrode NE, and the reflective layer REF. The insulating layer 20 may include a hydrophobic material.

The barrier wall WA is disposed on the insulating layer 20 and positioned at an edge portion of the pixel area PA. The barrier wall WA includes a side surface formed of a hydrophobic material and an upper surface formed of a hydrophilic material. The barrier wall WA accommodates a black fluid layer BO therein to prevent the black fluid layer BO from moving to adjacent pixel area.

The second substrate 200 is disposed to face the first substrate 100. The second substrate 200 may be an insulating substrate and formed of a transparent material.

At least one spacer (not shown) is disposed between the first substrate 100 and the second substrate 200, and thus a distance between the first substrate 100 and the second substrate 200 is maintained by the spacer.

The fluid layer 300 is disposed between the first substrate 100 and the second substrate 200 and includes the black fluid layer BO and a transparent fluid layer TP. The black fluid layer BO is disposed on the pixel area PA and includes a hydrophobic material (e.g., oil), which is a non-polar material. The black fluid layer BO includes black dyes or a light absorbing material to absorb the light incident on the first substrate 100 from outside of the first substrate 100.

The transparent organic layer TP includes a hydrophilic material (e.g., water), which is a polar material. The transparent organic layer TP includes a transparent material that transmits incident light.

The black fluid layer BO and the transparent fluid layer TP have different specific gravities from one another, and thus the black fluid layer BO and the transparent fluid layer TP do not mix with each other. That is, the black fluid layer BO and the transparent fluid layer TP are separated from each other, forming a boundary at the interface.

Figure 3A:
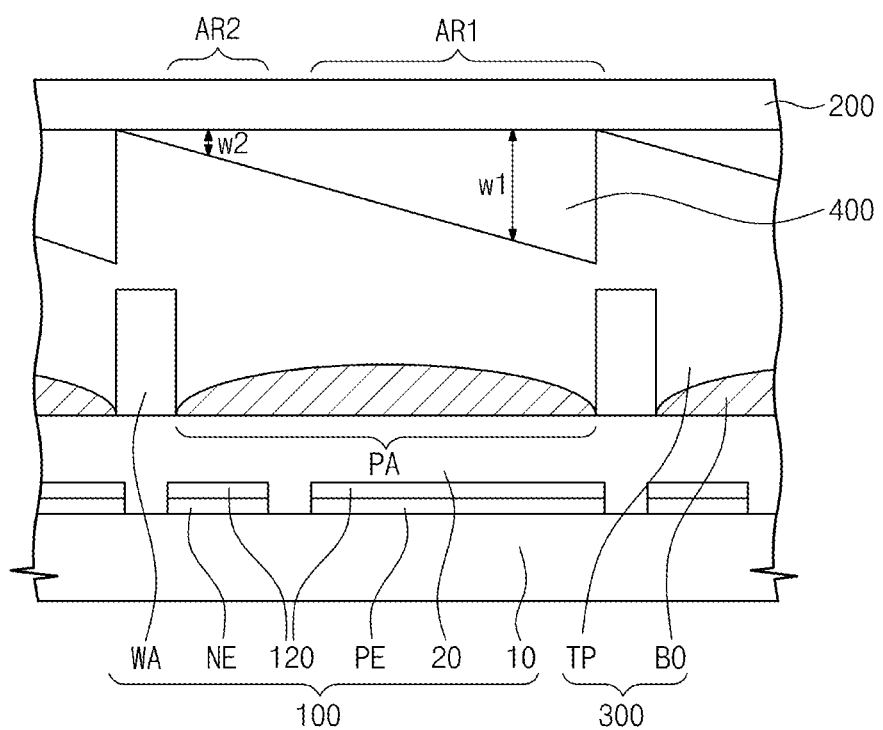
FIG. 3A is a cross-sectional view taken along a line I-I' when the electrowetting display apparatus shown in FIG. 2 represents a black gray-scale.

The color filter 400 has a thickness that gradually increases within the pixel area PA. For example, as shown in FIG. 2 and FIG. 3A, the thickness of the color filter 400 may increase going from one side of the pixel area to the opposite side. In the embodiment of FIG. 3A, the color filter 400 is thinnest where it is positioned over the second electrode NE, and the thickness linearly increases as it gets closer to the opposite side of the pixel area PA that is positioned over the first electrode PE. A surface of the color filter 400, which faces the first substrate 100, may be inclined at a predetermined angle with respect to the first substrate 100.

A user perceives colors by passing the light reflected by the reflective layer REF through the color filter 400.

Hereinafter, a relationship between an operation of the electrowetting display apparatus and the color filter 400 will be described in detail with reference to FIGS. 3A and 3B.

Figure 3B:
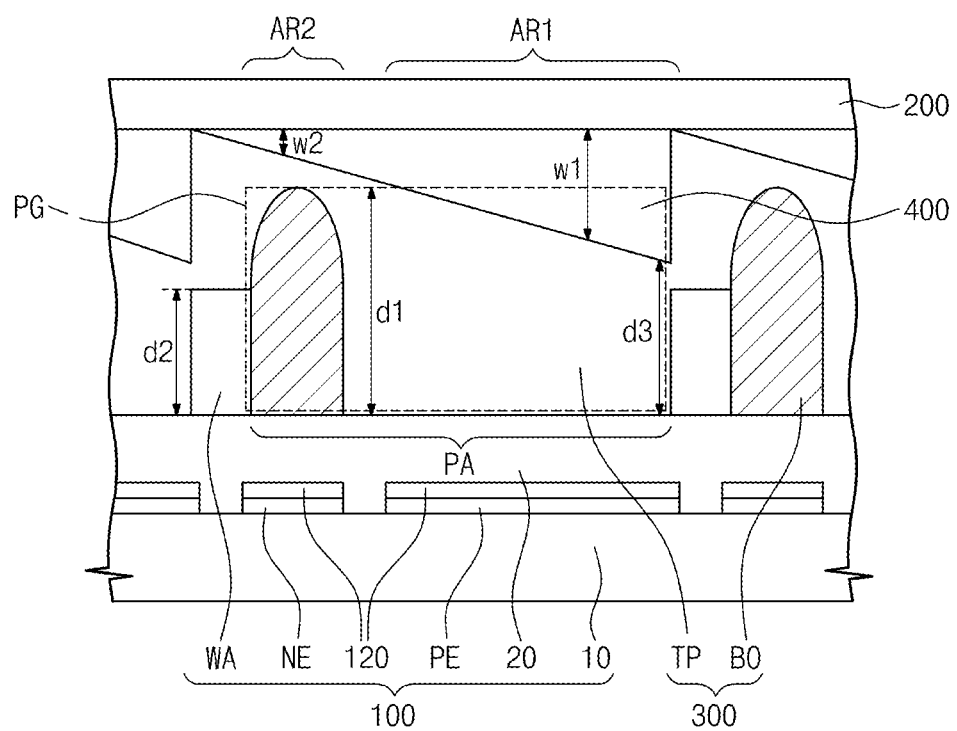
FIG. 3B is a cross-sectional view taken along a line I-I' when the electrowetting display apparatus shown in FIG. 2 represents a white gray-scale.

FIG. 3A is a cross-sectional view taken along a line I-I' when the electrowetting display apparatus shown in FIG. 2 represents a black gray-scale, and FIG. 3B is a cross-sectional view taken along a line I-I' when the electrowetting display apparatus shown in FIG. 2 represents a white gray-scale.

Referring to FIG. 3A, when the electrowetting display apparatus displays the black gray-scale, the second electrode NE receives a reference voltage and the first electrode PE receives a gray-scale voltage corresponding to the black gray-scale. The gray-scale voltage corresponding to the black gray-scale may have the same voltage level as the reference voltage.

Since no voltage difference exists between the first electrode PE and the second electrode NE, an electric field is not generated between the first electrode PE and the second electrode NE. The black fluid layer BO formed of the hydrophobic material is dispersed on the insulating layer 20 to cover the whole of the pixel area PA.

Thus, the light traveling to the pixel area PA is absorbed by the black fluid layer BO, and thus the user does not perceive the light, thereby displaying the black gray-scale.

The color filter 400 is disposed on the surface of the second substrate 200, which is adjacent to the fluid layer 300. The color filter 400 has a first thickness w1 in a portion of a first area AR1 corresponding to the first electrode PE. The first thickness w1 may change even within the first area AR1. The color filter 400 has a second thickness w2 in a portion of a second area AR2 corresponding to the second electrode NE. The second thickness w2 may change within the second area AR2. The first thickness w1 is larger than the second thickness w2.

Referring to FIG. 3B, when the electrowetting display apparatus displays the white gray-scale, the second electrode NE receives the reference voltage and the first electrode PE receives a gray-scale voltage corresponding to the white gray-scale. The gray-scale voltage corresponding to the white gray-scale has a voltage level different from that of the reference voltage.

Accordingly, since the voltage difference exists between the first electrode PE and the second electrode NE, the electric field is formed between the first electrode PE and the second electrode NE. Polar fluid molecules in the transparent fluid layer TP move to the first electrode PE along the electric field regardless of a low affinity toward the surface of the insulating layer 20 formed of the hydrophobic material.

Since the black fluid layer BO is non-polar and the polar fluid molecules of the transparent fluid layer TP do not mix with the non-polar molecules of the black fluid layer BO, the black fluid layer BO is pushed out by the transparent fluid layer TP. Accordingly, the black fluid layer BO is concentrated at the side of the pixel area PA, at which the second electrode NE is disposed.

Due to the concentrated black fluid layer BO, at least a portion of the light provided to the pixel area PA passes through the pixel area PA and is reflected by the reflective layer REF. Since the reflected light passes through the color filter 400, the user may perceive the light.

The color filter 400 is disposed on the surface of the second substrate 200, which is adjacent to the fluid layer 300. The color filter 400 has the first thickness w1 in the portion of the first area AR1 corresponding to the first electrode PE. The first thickness w1 may change within the first area AR1. The color filter 400 has the second thickness w2 in the portion of the second area AR2 corresponding to the second electrode NE. The second thickness w2 may change within the second area AR2. The first thickness w1 is larger than the second thickness w2.

The black fluid layer BO may have a height larger than that of the barrier wall WA. The black fluid layer BO has a first height d1 and the barrier wall WA has a second height d2 smaller than the first height d1. The side surface of the barrier wall WA is formed of the hydrophobic material and the upper surface of the barrier wall WA is formed of the hydrophilic material. Thus, although the black fluid layer BO is higher than barrier wall WA, the nonpolar black fluid layer BO does not move to the adjacent pixel area beyond the barrier wall WA. The nonpolar black fluid layer BO has a higher affinity toward the hydrophobic side surface of the barrier wall WA than the hydrophilic upper surface of the barrier wall WA.

In addition, the height d1 of the black fluid layer BO may be larger than a shortest distance d3 between the color filter 400 and the upper surface of the first substrate 100.

The color filter 400 corresponding to at least a portion of the second area AR2 is inserted into a pixel space PG defined by the height d1 of the black fluid layer 400 and the pixel area PA (see FIG. 3B). Different from the above-mentioned structure, a conventional electrowetting display apparatus includes a color filter having uniform thickness. A color filter of uniform thickness is required to be spaced apart from the black fluid layer, and thus a cell gap is required.

Therefore, when the color filter 400 has the thickness that is variable, a cell gap in the electrowetting display apparatus according to the present exemplary embodiment may be reduced by the thickness of the color filter of the conventional electrowetting display apparatus.

FIGS. 3A and 3B show the relationship between the operation of the electrowetting display apparatus and the color filter 400 when the electrowetting display apparatus displays the black gray-scale and the white gray-scale. As the voltage difference between the gray-scale voltage and the reference voltage becomes large, the number of the polar fluid molecules that move to the first electrode PE increases. Thus, the amount of the black fluid layer BO pushed out to the second electrode NE is increased. In other words, the amount of surface in the pixel area PA that is covered by the black fluid layer BO may be controlled by the voltage level that is applied to the first electrode PE. Hence, various gray-scales may be displayed by adjusting the voltage that is applied to the first electrode PE.

Although FIGS. 2, 3A, and 3B show a reflective type electrowetting display apparatus that reflects the external light using the reflective layer REF, the electrowetting display apparatus of the invention is not limited to the reflective type. For example, the electrowetting display apparatus according to the present exemplary embodiment may be a transmissive type electrowetting display apparatus. The transmissive type electrowetting display apparatus includes a backlight unit (not shown) disposed under the first substrate 100, controls the surface area of the black fluid layer covering the pixel area, and controls a transmittance of the light generated by the backlight unit so as to display the image. To this end, the transmissive type electrowetting display apparatus does not include the reflective layer REF, which is different from the reflective type electrowetting display apparatus.

Figure 4:
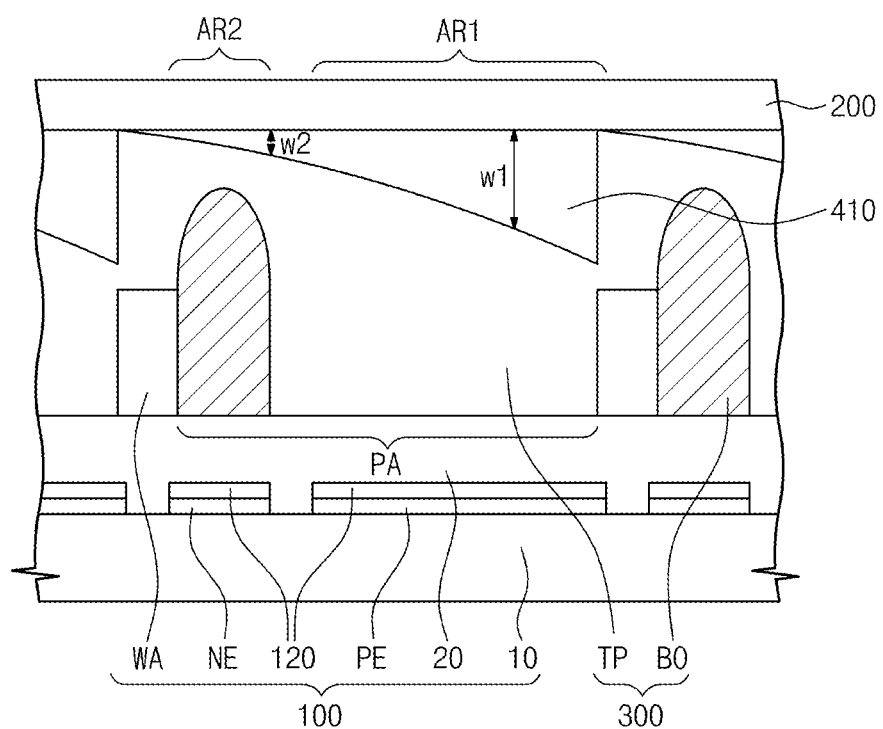
FIG. 4 is a cross-sectional view showing a portion of an electrowetting display apparatus according to an exemplary embodiment of the present invention.

FIG. 4 is a cross-sectional view showing a portion of an electrowetting display apparatus according to an exemplary embodiment of the present invention. In FIG. 4, the electrowetting display apparatus has substantially the same structure and function as those of the electrowetting display apparatus shown in FIGS. 2, 3A, and 3B except that a color filter has a shape different from that of the color filter 400 shown in FIGS. 2, 3A, and 3B. Accordingly, the color filter 410 will be described in detail hereinafter. In addition, in FIG. 4, the same reference numerals denote the same elements in FIGS. 2, 3A, and 3B, and thus a detailed description of the same elements will be omitted.

The color filter 410 is disposed on a surface of the second substrate 200, which is adjacent to the fluid layer 300. The color filter 410 has a first thickness w1 in a first area AR1 corresponding to the first electrode PE. The first thickness w1 may change within the first area AR1. The color filter 410 has a second thickness w2 in a second area AR2 corresponding to the second electrode NE. The second thickness w2 may change within the second area AR2. The first thickness w1 is larger than the second thickness w2.

The color filter 410 gradually becomes thicker within the pixel area PA. As shown in FIG. 4, the thickness of the color filter 410 increases going from one side of the pixel area PA to the opposite side. In the particular embodiment, the color filter 410 is thinner where it is positioned over the second electrode NE, and becomes thicker as it gets closer to the opposite side of the pixel area PA that is positioned over the first electrode PE. The surface of the color filter 410 that is closest to the first substrate 100 may be curved.

The electrowetting display apparatus according to the present exemplary embodiment shown in FIG. 2 is manufactured by the following processes.

Referring to FIG. 2 again, at least one pixel area PA is defined in the first substrate 100. The first electrode PE is disposed in the pixel area PA and supplied with the gray-scale voltage, and the second electrode NE spaced apart from the first electrode PE and supplied with the reference voltage is formed on the first substrate 100. The first electrode PE and the second electrode NE are electrically insulated from each other. Then, the second substrate 200 is prepared. The color filter 400 is formed on the second substrate 200. The thickness of the color filter 400 gradually increases going from one side of the pixel area PA to an opposite side of the pixel area PA. After that, the black fluid layer BO and the transparent fluid layer TP fill the space between the first substrate 100 and the second substrate 200, and the first substrate 100 and the second substrate 200 are coupled with each other.

Figure 5A:
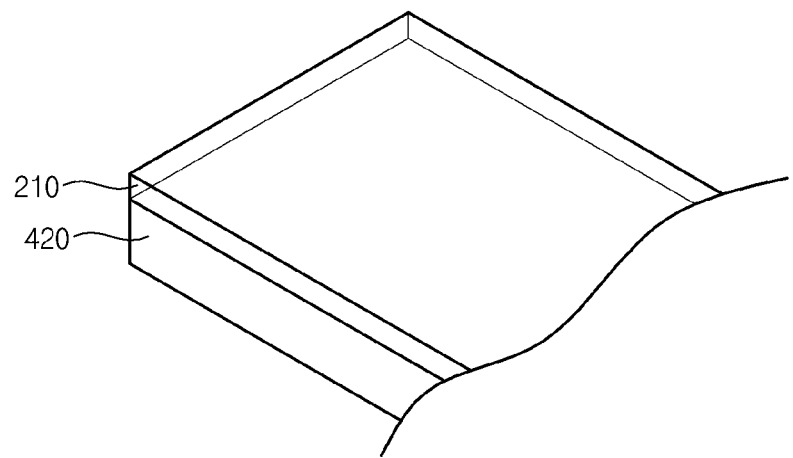
FIGS. 5A to 5C are views showing a method of forming a color filter according to an exemplary embodiment of the present invention.
Figure 5B:
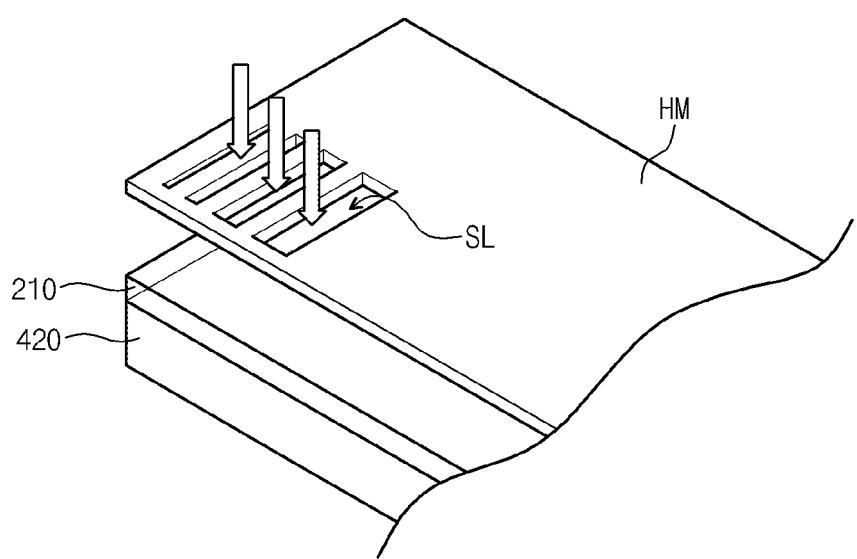
Figure 5C:
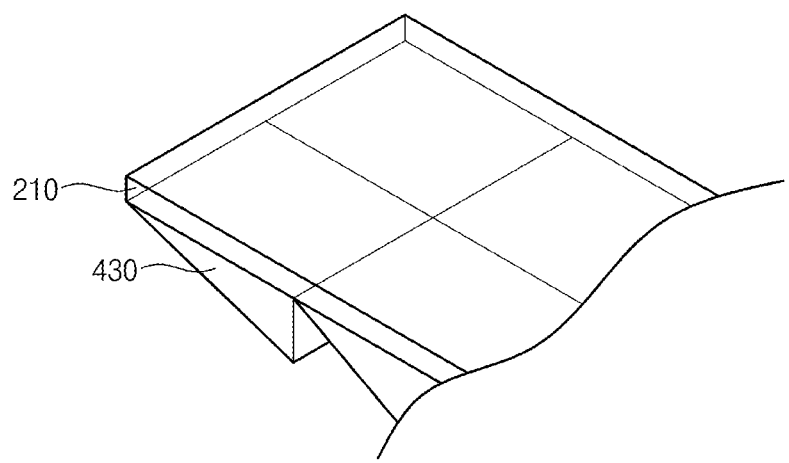

FIGS. 5A to 5C are views showing a method of forming a color filter according to an exemplary embodiment of the present invention.

Referring to FIG. 5A, a color filter layer 420 is coated on the rear surface of the second substrate 210. The color filter layer 420 may include at least one color to correspond to the pixel area. The color filter layer 420 has a uniform thickness. The color filter layer 420 includes a negative reactive material with respect to light.

Referring to FIG. 5B, a half-tone mask HM through which a plurality of slits SL is formed is provided on the second substrate 210. The half-tone mask HM is disposed corresponding to the pixel area. The slits SL extend in a first direction substantially parallel to a side of the pixel area, and are arranged in a second direction that is substantially perpendicular to the first direction. The slits SL become gradually larger going in the second direction, such that the slit SL that is farthest from the edge of the half-tone mask HM that extends in the first direction is the largest slit. The slits SL are spaced apart from each other at a regular interval.

The color filter layer 420 is exposed to the light through the half-tone mask HM. Since the area of the slits SL is increased as the slits SL are far away from the side of the pixel area, the amount of the light passing through the slits SL is increased as the slits SL are far away from the side of the pixel area. Accordingly, the color filter layer 420 is cured differently in different areas according to the area of the slits SL.

When the exposed color filter layer 420 is etched, a portion of the color filter layer 420 corresponding to one side of the pixel area is becomes etched more than a portion of the color filter layer 420 corresponding to an opposite side of the pixel area. As a result, the thickness of the color filter layer 420 gradually changes going from one side of the pixel area to the other side of the pixel area.

FIG. 5B shows a process of forming the color filter corresponding to one pixel area, and color filters having the same color may be formed by the same single process. Then, when the processes shown in FIGS. 5A and 5B are repeatedly performed, the color filters having various colors are sequentially formed. For instance, in the case that the color filters having red, green, blue, and white colors are formed, the red color filters are formed by a single process, green color filters are formed by a single process, blue color filters are formed by a single process, and white colors are formed by a single process, sequentially.

Referring to FIG. 5C, a color filter 430 is formed with a thickness that gradually increases from one side of the pixel area to the other side of the pixel area. The lower surface of the color filter 430 may be inclined at a predetermined angle with respect to the second substrate 200.

Figure 6:
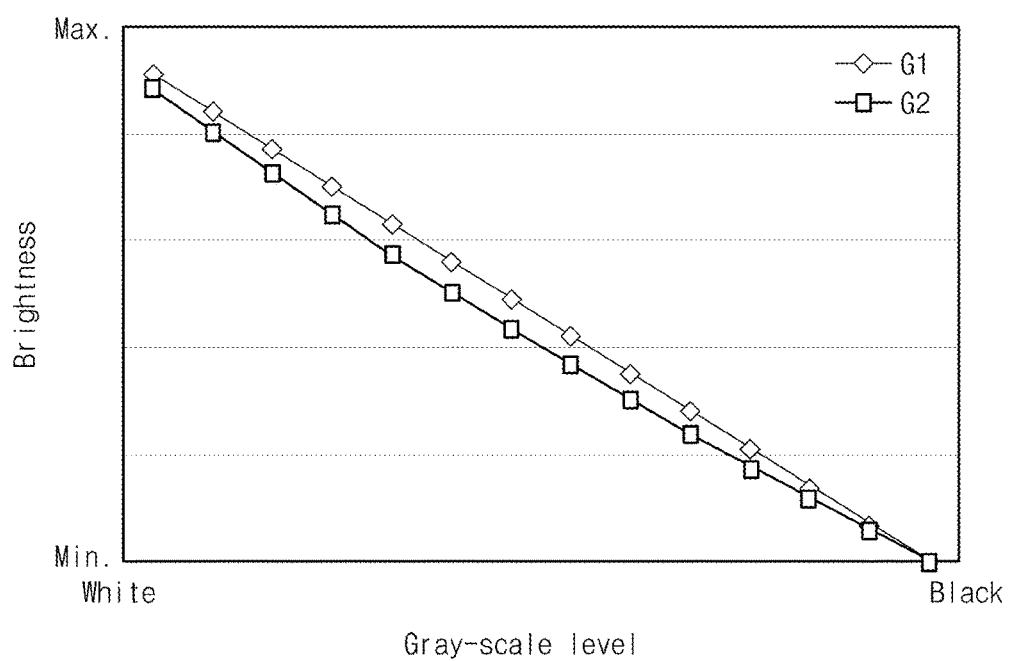
FIG. 6 is a graph showing a variation of brightness according to gray-scales in accordance with a conventional electrowetting display apparatus and an electrowetting display apparatus of the present invention.

FIG. 6 is a graph showing a variation of brightness according to gray-scale levels in accordance with a conventional electrowetting display apparatus and an electrowetting display apparatus of the present invention. The plot line formed by data points G2 represent the brightness of an exemplary embodiment of the invention, and the plot line formed by data points G1 represent the brightness of a conventional device.

According to FIG. 6, there is no significant brightness difference between the display apparatus G2 according to the present exemplary embodiment and the conventional display apparatus G1. As described above, the cell gap may be reduced by the shape of the color filter in the electrowetting display apparatus according to the present exemplary embodiment.

In the reflective type electrowetting display apparatus, the amount of light that is reflected by the reflective layer increases when the cell gap is reduced, thus enhancing the whole brightness. However, the thickness of the area through which the reflected light passes may be thicker in the exemplary embodiment than in the conventional electrowetting display apparatus. Hence, the light transmittance in the electrowetting display apparatus according to the present exemplary embodiment may be low compared with the conventional electrowetting display apparatus. Consequently, there is no significant brightness difference between the display apparatus G2 according to the present exemplary embodiment and the conventional display apparatus G1.

Although not shown in the figures, in the case of the electrowetting display apparatus according to the present exemplary embodiment, the cell gap and the crosstalk are reduced.

Figure 7:
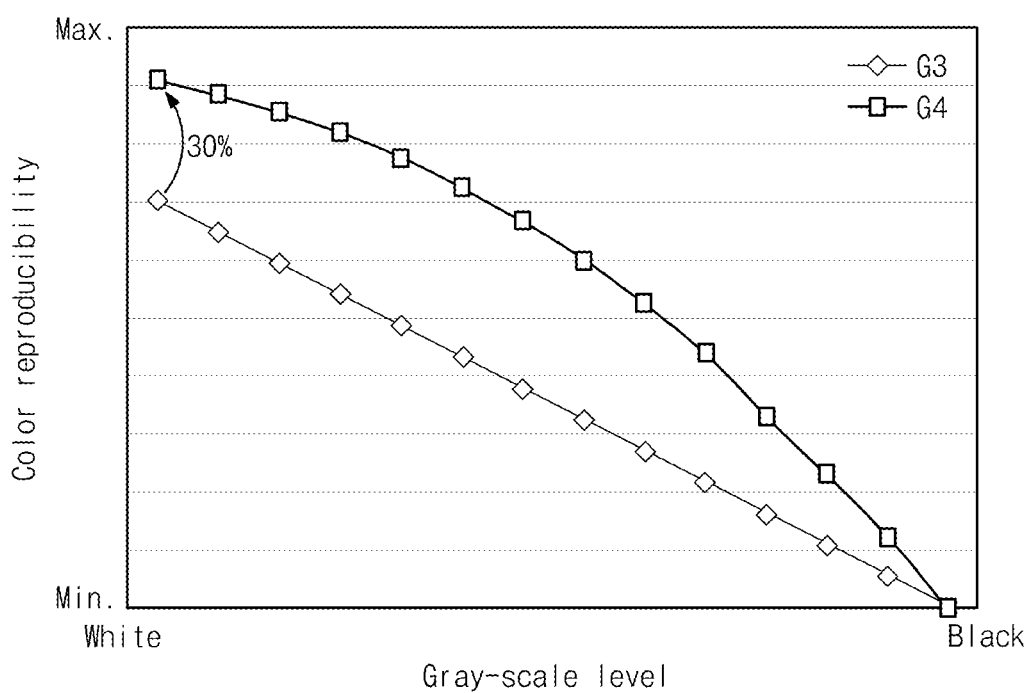
FIG. 7 is a graph showing color reproducibility according to gray-scales scales in accordance with a conventional electrowetting display apparatus and an electrowetting display apparatus of the present invention.

FIG. 7 is a graph showing color reproducibility according to gray-scale levels in accordance with a conventional electrowetting display apparatus and an electrowetting display apparatus of the present invention.

According to FIG. 7, the electrowetting display apparatus G4 according to the present exemplary embodiment has the color reproducibility higher than that of the conventional electrowetting display apparatus G3 in each gray-scale level. Since the color reproducibility of the color filter and the light transmittance of the color filter are in a trade-off relationship, the color reproducibility becomes higher when light transmittance is lowered due to the presence of a color filter. The color reproducibility of the electrowetting display apparatus G4 according to the present exemplary embodiment is increased by about 30% compared with that of the conventional electrowetting display apparatus G3 as shown in FIG. 7.

In addition, the amount of material required to form the color filter of the electrowetting display apparatus according to the present exemplary embodiment is smaller than that required to form the color filter of the conventional electrowetting display apparatus. This reduction in the amount of material translates to reduced manufacturing cost for the electrowetting display apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electrowetting display apparatus comprising:
   first and second substrates;
   first and second electrodes;
   a fluid layer disposed between the first substrate and the second substrate, wherein the fluid layer is configured to move due to a voltage difference between (i) a first voltage received at the first electrode and (ii) a second voltage received at the second electrode; and
   a color filter disposed on a surface of the second substrate adjacent to the fluid layer, wherein the color filter has a first thickness and a second thickness, and wherein the first thickness is larger than the second thickness.

2. The electrowetting display apparatus of claim 1, wherein the first substrate includes the first and second electrodes, and wherein the second electrode is insulated from the first electrode.

3. The electrowetting display apparatus of claim 2, wherein the first thickness of the color filter is located in an area corresponding to the first electrode and the second thickness of the color filter is located in an area corresponding to the second electrode.

4. The electrowetting display apparatus of claim 2, wherein a surface of the color filter that faces the first substrate is inclined at a predetermined angle with respect to the first substrate.

5. The electrowetting display apparatus of claim 2, wherein the first substrate further comprises a first reflective layer disposed on the first electrode and a second reflective layer disposed on the second electrode.

6. The electrowetting display apparatus of claim 1, further comprising barrier walls between the first and second substrates.

7. The electrowetting display apparatus of claim 6, wherein the color filter increases in thickness in a direction from a first barrier wall towards a second barrier wall, and wherein the second barrier wall is opposite to the first barrier wall.

8. The electrowetting display apparatus of claim 7, wherein the first substrate includes the first and second electrodes, and wherein the first electrode is adjacent to the first barrier wall and the second electrode is adjacent to the second barrier wall.

9. The electrowetting display apparatus of claim 1, wherein a surface of the color filter facing the first substrate has a curved shape.

10. An electrowetting display apparatus comprising:
    first and second substrates;
    a plurality of barrier walls between the first substrate and the second substrate, wherein the barrier walls define a plurality of pixel areas, and wherein each pixel area comprises:
       first and second electrodes;
       a fluid layer, wherein the fluid layer is configured to move due to a voltage difference between (i) a first voltage received at the first electrode and (ii) a second voltage received at the second electrode; and
       a color filter disposed on a surface of the second substrate adjacent to the fluid layer, wherein the color filter has a first thickness and a second thickness, and wherein the first thickness is larger than the second thickness.

11. The electrowetting display apparatus of claim 10, wherein the first substrate includes the first and second electrodes, and wherein the second electrode is insulated from the first electrode.

12. The electrowetting display apparatus of claim 11, wherein the first thickness of each color filter is located in a corresponding pixel area corresponding to the first electrode and the second thickness of each color filter is located in the corresponding pixel area corresponding to the second electrode.

13. The electrowetting display apparatus of claim 11, wherein a surface of each color filter that faces the first substrate is inclined at a predetermined angle with respect to the first substrate.

14. The electrowetting display apparatus of claim 11, wherein each pixel area further comprises a first reflective layer disposed on the first electrode and a second reflective layer disposed on the second electrode to reflect light incident from outside of the first substrate.

15. The electrowetting display apparatus of claim 10, wherein the color filters within the pixel areas increase in thickness within a corresponding pixel area in a direction from a first barrier wall located at a first side of the corresponding pixel area towards a second barrier wall located at a second side of the corresponding pixel area, and wherein the second side of the corresponding pixel area is opposite to the first side of the corresponding pixel area.

16. The electrowetting display apparatus of claim 10, wherein a surface of each color filter facing the first substrate has a curved shape.

17. A method of manufacturing an electrowetting display apparatus, comprising:
    forming a first substrate that includes at least one pixel area, wherein the first substrate includes a first electrode and a second electrode insulated from the first electrode;
    providing a second substrate opposite to the first substrate;
    forming a color filter on a surface of the second substrate, the color filter having a thickness that increases in going from a first side of the pixel area to a second side of the pixel area that is opposite the first side;
    forming a fluid layer between the first substrate and the second substrate; and
    coupling the first substrate with the second substrate.

18. The method of claim 17, wherein forming the color filter comprises:
    coating a color filter layer on a rear surface of the second substrate;
    providing a half-tone mask on an upper surface of the second substrate, wherein the half-tone mask includes a plurality of slits formed therethrough;
    exposing a portion of the color filter layer to light through the half-tone mask; and
    etching the exposed portion of the color filter layer.

19. The method of claim 18, wherein the slits extend in a first direction substantially parallel to the first side of the pixel area, and wherein the slits increase in size the further the slits are located from the first side of the pixel area.

20. The method of claim 19, wherein the slits are spaced apart from each other at a regular interval.

21. The method of claim 19, wherein the color filter layer comprises a negative reactive material with respect to light.

* * * * *